United States Patent [19]
Berge et al.

[11] Patent Number: 5,808,557
[45] Date of Patent: Sep. 15, 1998

[54] ELECTRONIC SENSOR MODULE

[75] Inventors: Gerhard Berge, Pfungstadt; Frank Mewes, Worms, both of Germany

[73] Assignee: KSB Aktiengesellschaft, Frankenthal, Germany

[21] Appl. No.: 624,693

[22] Filed: Mar. 25, 1996

[30] Foreign Application Priority Data

Mar. 24, 1995 [DE] Germany ............... 195 10 416.1

[51] Int. Cl.$^6$ .................................................. G08C 19/16
[52] U.S. Cl. ................. 340/870.01; 340/679; 340/853.2
[58] Field of Search .................... 340/679, 680, 340/853.3, 855.3, 853.2, 870.31, 870.32, 870.01

[56] References Cited

U.S. PATENT DOCUMENTS

| | | | |
|---|---|---|---|
| 3,717,858 | 2/1973 | Hadden | 321/2 |
| 4,176,396 | 11/1979 | Howatt | 364/551 |
| 4,357,605 | 11/1982 | Clements | 340/825.14 |
| 4,972,099 | 11/1990 | Amano et al. | 307/303 |
| 5,166,677 | 11/1992 | Schoenbera | 340/853.3 |
| 5,212,645 | 5/1993 | Wildes et al. | 340/680 |
| 5,331,538 | 7/1994 | DiGiulio et al. | 364/134 |
| 5,463,567 | 10/1995 | Boen et al. | 364/55.01 |
| 5,561,610 | 10/1996 | Schricker et al. | 340/679 |
| 5,594,663 | 1/1997 | Messaros et al. | 364/550 |

FOREIGN PATENT DOCUMENTS

| | | |
|---|---|---|
| A-0 254 142 | 1/1988 | European Pat. Off. . |
| A-0 340 418 | 11/1989 | European Pat. Off. . |
| 24 09 236 A1 | 2/1974 | Germany . |
| 28 28 995 C2 | 7/1978 | Germany . |
| 87 10 236 U | 7/1987 | Germany . |
| 37 43 847 A1 | 12/1987 | Germany . |
| 88 09 093 U | 7/1988 | Germany . |
| 89 06 789 U | 6/1989 | Germany . |
| A-39 15 682 | 11/1990 | Germany . |
| 42 16 242 A1 | 5/1992 | Germany . |
| 92 12 302 U | 9/1992 | Germany . |
| 92 14 646 U | 10/1992 | Germany . |
| 43 04 521 A1 | 2/1993 | Germany . |
| U-92 14 646 | 2/1993 | Germany . |
| U-93 09 152 | 9/1993 | Germany . |

Primary Examiner—Brian Zimmerman
Assistant Examiner—Timothy Edwards, Jr
Attorney, Agent, or Firm—Darby & Darby

[57] ABSTRACT

A monitoring system for transmitting test and measurement data from sensors located within a machine to a common evaluation unit located remote of the machine. The monitoring system includes sensors for monitoring the operating conditions of a machine. The data generated from each sensor is first transmitted to a common receiving module located within the machine. The receiving module than transmits the collected data to the evaluating unit.

13 Claims, 2 Drawing Sheets ns 5,808,557

ELECTRONIC SENSOR MODULE

BACKGROUND OF THE INVENTION

1. Field of the Invention

The present invention relates to a system for transmitting test and measurement data. More particularly, the present invention relates to a system for collecting data from a plurality of sensors which monitor and measure the operating conditions of a machine and transmitting the data to an evaluating unit located remote of the machine.

2. Discussion of the Related Art

The monitoring of pump systems, valves or motors installed in hard-to-reach locations can be very costly and time-consuming. It is often difficult for personnel to physically reach a site to inspect the condition of a machine located at that site, for example, a motorized underwater pump installed in a well; a submersible pump installed in a sewage-treatment plant; controls and machinery in reactor systems and in pipelines and other similar installations. It is therefore common to incorporate monitoring systems that are equipped with sensors to monitor various conditions of the machine, such as temperature, pressure, speed, moisture, etc. The resulting data from these sensors are used to indicate the "health" of the machine and to justify a particular maintenance or repair schedule of the machine. However, the methods used to collect the data from the sensors in these prior art monitoring systems are complex and costly.

Each sensor of the prior art monitoring system is connected to the machine according to its particular function. Each such sensor includes a dedicated communication line connected to an appropriate evaluation instrument located remote of the machine. In exceptional cases at best, minimal monitoring is possible with sensors mounted outside the machine, at which point the integrity of the machine's housing is maintained. However, for specific measurements which are vital for the longevity of a machine, such as the temperature of either a motor or bearing, the use of internal sensors is indispensable. In such instance, an opening is provided in the machine's housing for each dedicated line from each sensor. In operating environments which require that the machine be sealed and protected, for example, in submerged machine applications, each opening in the housing used for each sensor communication line must be sealed against contamination by the environment. The sealing of additional openings in the machine housing will invariably increase expense as well as unnecessary risk to the machine.

Accordingly, it is an object of the present invention to overcome the above mentioned shortcomings by providing a sensor system which reduces the complexity and cost in the acquisition and evaluation of measurement and control data from within a machine.

SUMMARY OF THE INVENTION

The present invention relates to a monitoring system for transmitting test and measurement data from sensors located within a machine to a common evaluation unit located remote of the machine. The present monitoring system includes sensors for monitoring the operating conditions of a machine. The data generated from each sensor is first transmitted to a common receiving module located within the machine. The receiving module then transmits the collected data to the evaluating unit.

The receiving module can be installed directly into machines such as pump systems, flow controls, motors and the like, and may include a dedicated shielded housing to protect against adverse environments located within the machine itself. For example, the shielding reliably prevents the electronics of the receiving module from being affected by magnetic fields associated with the construction and operation of an electric motor. The shielding is also pressure-resistant and water-tight.

Sensors located inside a machine are directly connected to the receiving module which, due to its pressure-resistant and water-tight enclosure, may be used in a water environment. The receiving module controls the acquisition of data supplied by the various sensors within and around the machine and converts them to a uniform data format. An integral communication bus in the receiving module serves to transmit the converted data to an evaluation or monitoring instrument located outside the machine. In essence, the receiving module operates as a data compressor of sensor data from within the machine, and uses the communication bus to easily transmit the collected data to the external evaluating unit.

In accordance with another embodiment of the invention, the receiving module is equipped with a power regulator to provide a stable direct current. Therefore, an unregulated direct-current potential, such as 12 to 24 V, may be supplied to receiving module. Owing to the stable direct current generated within the receiving module, as well as the voltage potential supplied to it, the receiving module is capable of operating various types of sensors.

The receiving module is adapted to be interconnected with other receiving modules within the machine. Each receiving module has the capability of handling the data from a prescribed number of sensors. The ability to couple several receiving modules together provides simplified expandability of the present monitoring system.

The number of sensors a receiving module will accept depends on the particular design of the receiving module. For example, a benchmark model of a receiving module was equipped with connections for up to 10 sensors as well as power-supply connectors. The receiving module includes a power-supply output to supply appropriate power to any of the 10 sensors that require power. Similarly, power from the receiving module may be supplied to other coupled receiving modules and, in turn, to their respective sensors, as required.

The benchmark receiving module permits the coupling of three additional receiving modules which enables the array to handle up to 40 sensors. Regardless of the number of receiving modules and sensors used in the present monitoring system, a single connecting cable effectively connects all of the sensors to the external evaluating unit. The connecting cable includes four-wires; two being used to supply power to the receiving module, while the other two serve as data communication lines via a bus connection. The outputs of each coupled receiving modules are linked internally using conventional electrical connectors.

In another embodiment of the present invention, a receiving module incorporates individual sensors for the acquisition, uniform conversion and transmission of the data supplied by similar type sensors. The receiving module may also be connected to an external evaluating unit by a single-wire or two-wire bus connection. A fiber-optic cable may be used with the bus connection, but may increase the complexity of the data transfer process within the receiving module. As is appreciated, two-wire lines connected to a bus system are easier for data transmission.

In yet another embodiment of the present invention, data transmission between the receiving module and the evaluating unit takes place using the power-supply line. This configuration minimizes the amount of communications wiring required for a hard-wired data transmission system. For applications where measurement and test data are needed only while the machine is running, both the power supply and data transmission for the monitoring system can be transmitting using the power cable of the machine itself which further reduces the wiring requirements. In this case, additional components inside the receiving module would channel the data along the power cable. The standardized data can be fed into the power cable and retrieved at the other end by the evaluating unit. For wireless data transmission, the receiving module would include an appropriate modem.

In still another embodiment of the present invention, a programmable micro controller is provided inside the receiving module for processing the data from each sensor and for controlling data communication both within and outside the receiving module.

Additionally, the receiving module generates operating and/or reference voltages for the local internal electronics and for any connected sensor.

The shielding of one or several (if coupled) receiving modules may include a steel tube. Tests performed have shown that a steel tube that is longer than the receiving module and whose open ends extend beyond the ends of the receiving module, and when properly mounted, will provide reliable shielding against magnetic fields in the area of the coil ends of electric motors. Therefore, shielding the receiving modules using expensive metal enclosures is not necessary. Protection of the receiving module against moisture, pressure and vibration can be accomplished by conventional sealing and insulating methods.

BRIEF DESCRIPTION OF THE DRAWINGS

The above and still further, objects, features and advantages of the present invention will become apparent upon consideration of the following detailed description of a specific embodiment thereof, especially taken in conjunction with the accompanying drawings wherein.

DETAILED DESCRIPTION OF THE PREFERRED EMBODIMENTS

Figure 1:
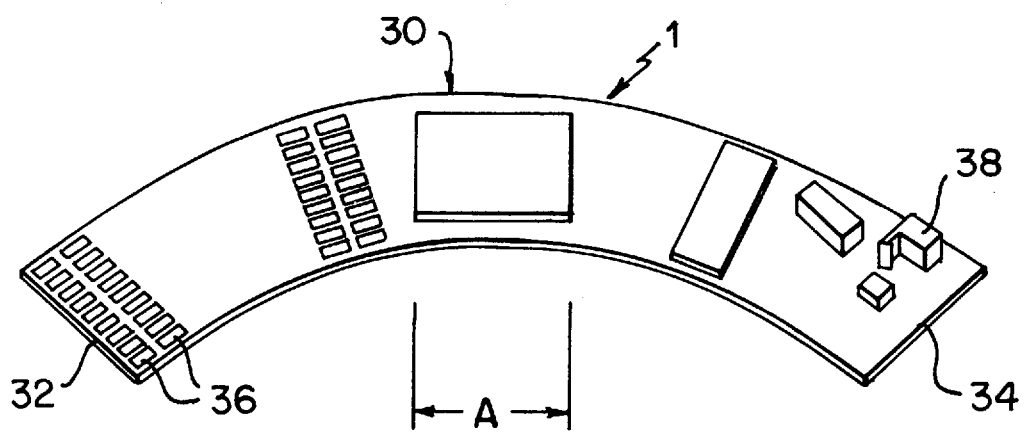
FIG. 1 is a plan view of a receiving module in accordance with the present invention.

The monitoring system of the present invention includes a receiving module 1, sensors (not shown), an evaluation unit 10, and a connecting bus 9. Referring to FIG. 1, a plan view of receiving module 1 is shown supported on a circuit board 30, in accordance with the invention. The dimension A depicted adjacent to receiving module 1 in FIG. 1 is used to illustrate the relative size of receiving module 1. It is noted that a dimension A is approximately 23.5 mm. As shown in FIG. 1, circuit board 30 is curved and includes a first end 32 and second end 34. In this preferred embodiment, curved printed-circuit board 30 is sized and shaped to be easily installed within an electric motor 11 (see FIGS. 3 and 4). In particular, the curvature of circuit board 30 is chosen so that receiving module 1 may be mounted adjacent to a coil end 12 of the electric motor 11 (see FIGS. 3 and 4).

Receiving module 1 includes sensor connections 36 for connecting lines to each sensor, and power supply and data transmission connections 38. In this preferred embodiment of the invention as shown in FIG. 1, sensor connections 36 are located adjacent to first end 32 of circuit board 30. Adjacent to second end 34 of circuit board 30 are power input and data transmission connections 38.

Although shown curved, printed circuit board 30 may be any suitable shape, depending on the particular application, to facilitate integration with a machine of interest. For example, receiving module 1 may be configured so that all electronic components are mounted on a ceramic substrate therefore eliminating the need for a conventional and otherwise bulky printed-circuit board. Further it is to be understood that receiving module 1 may be appropriately configured so that it may be practically implemented in any machine.

Figure 2:
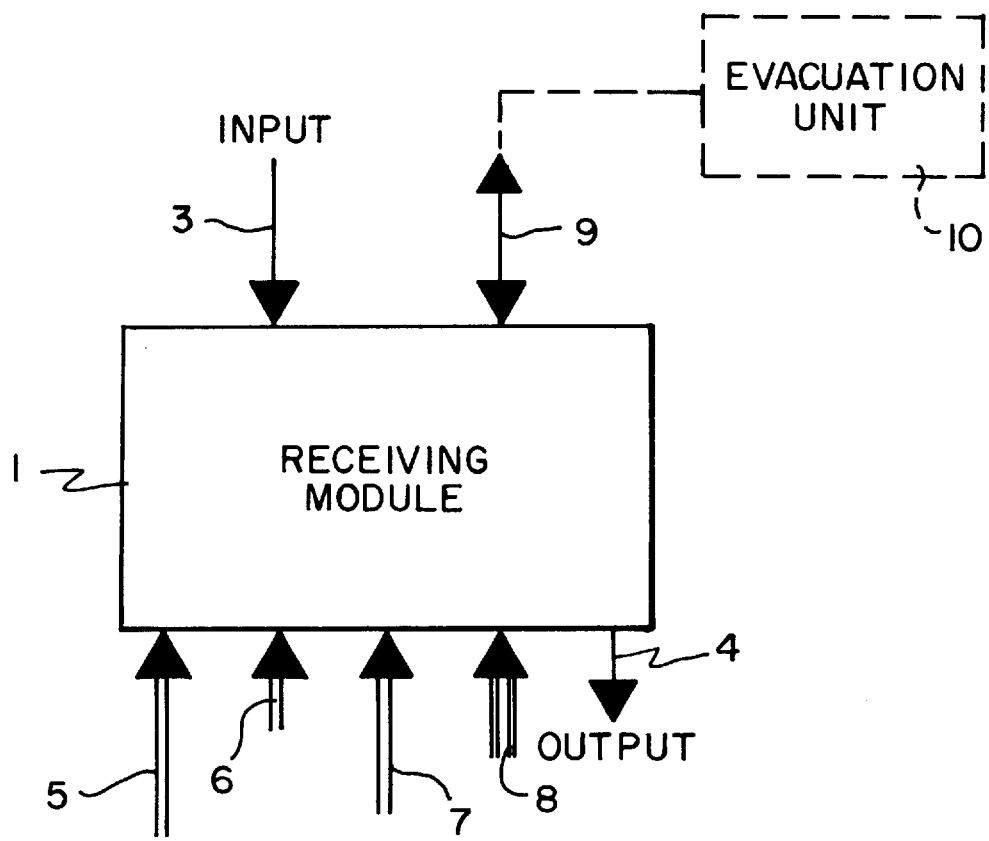
FIG. 2 is a block diagram of the receiving module of FIG. 1, in accordance with the present invention.

FIG. 2 illustrates a circuit block diagram depicting various circuit connections for receiving module 1. In particular, receiving module 1 includes an input lead 3 operative as the power supply for receiving module 1. A direct-current (DC) power supply is preferred for supplying an unregulated potential between 12 and 24 volts DC to receiving module 1. Thus, receiving module 1 would include appropriate sub-circuitry for generating a stable DC operating voltage. This stable DC potential can be supplied to each sensor using an output connector 4. Output connector 4 may also carry an unregulated potential that would power additional, coupled in-line receiving module or modules (not shown).

With continued reference to FIG. 2, arrows 5 to 8, each of varying length, represent the input ports of sensors, each of which have different functions and parameters. Dual-shafted arrows of FIG. 2 represent two similar sensors connected together (e.g. two model PT100 sensors could be connected to the input port 5 of receiving module 1 of FIG. 2). Further, by way of example, "PTC" sensors could be connected to port 6 of receiving module 1, for monitoring the temperature of a motor winding or the fluid level of a tank. Port 7 of receiving module 1 could serve for the input of reference signals in the 0 to 5 VDC range. Port 8 of receiving module 1 would accept four digital inputs from corresponding sensors.

A bus connector 9 is used to electrically connect receiving module 1 with an evaluating unit 10. The dashed outline of unit 10 indicates its positioning at an external location.

Figure 3:
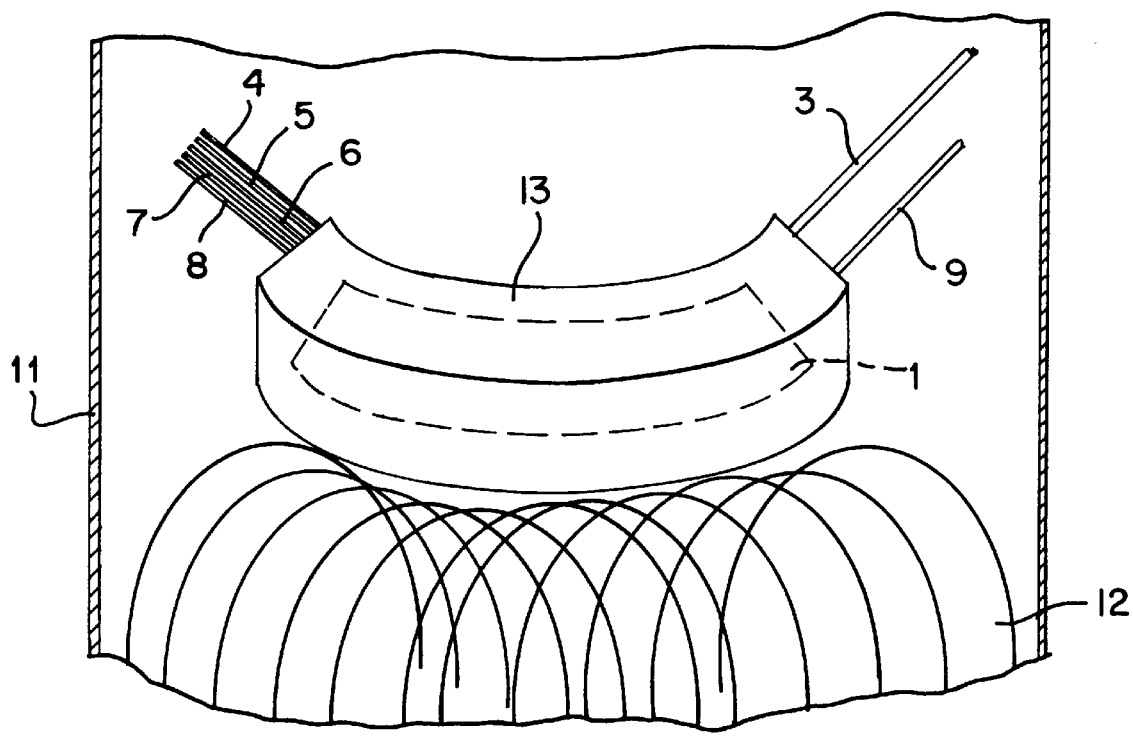
FIG. 3 is a schematic showing the installation of a single receiving module in a machine, in accordance with one embodiment of the invention.

Referring now to FIG. 3, a schematic representation of the placement of the receiving module 1 inside an electric motor 11 is shown. Regarding electric motor 11, only the coil head 12 is shown, above which an operational receiving module 1 is located. Receiving module 1 is configured as an electronic component. An external enclosure 13 provides receiving module 1 with the necessary shielding, pressure resistance and impermeability to liquids. Lead 3, leads 5 through 8, and lead 9 are identical to the receiving module 1 connections illustrated in the schematic of FIG. 2. Insulation is located inside enclosure 13 to provide the desired pressure-resistant qualities. The insulation can be provided by conventional insulating and sealing techniques. For reasons of clarity, the insulation is not shown in the figures.

Figure 4:
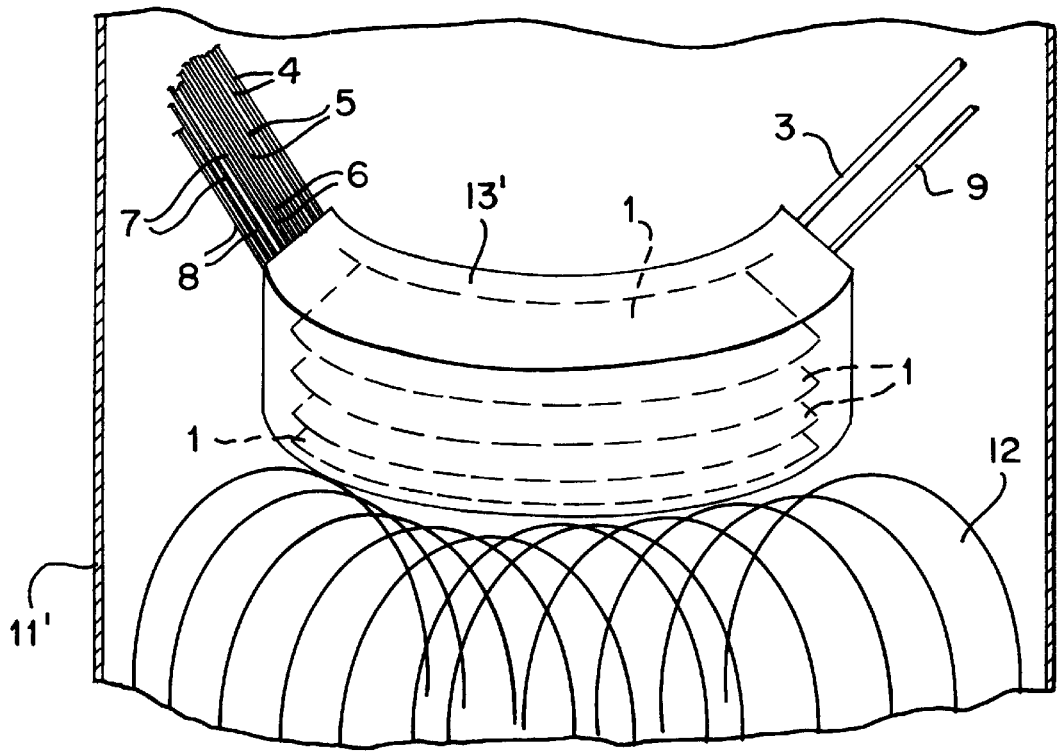
FIG. 4 is a schematic showing the installation of four coupled receiving modules in a machine, in accordance with another embodiment of the invention.

Referring to FIG. 4, an electric motor 11' is shown that is substantially similar to the motor 11 of FIG. 3 with the exception that an enclosure 13' houses a total of four coupled receiving modules 1, instead of just one. Each receiving module 1 controls a predetermined number of sensors. Coupling receiving modules 1, as shown in FIG. 4, will increase the total number of sensors that can be used in monitoring a machine.

A significant benefit of the present monitoring system over the prior art monitoring systems is that the present system requires only leads 3 and 9 to be passed through the housing of the machine. When coupled together, as shown in FIG. 4, receiving sensors 1 are electrically interconnected within the enclosure 13.

Another benefit of the present invention is that receiving module 1 may be operated under conditions that are potentially explosive environments and therefore subject to explosion-safety regulations.

It is to be understood that it is not necessary to mount several receiving modules 1 inside a single enclosure. Certain applications of the present invention require that groups of sensors be positioned throughout the machine at different locations. It is preferable to dedicate a receiving module 1 for each group of sensors. Each receiving module 1 is positioned in the immediate area of each respective group of sensors. Each receiving module 1 is interconnected to each other using any appropriate wiring and connections. As discussed above, only a primary (pre-selected) receiving module 1 communicates with the remotely located evaluation unit 10. Data from all sensors pass first through their local "group" receiving module 1, then to the primary receiving module, and finally to evaluation unit 10.

Having described the presently preferred exemplary embodiments of a monitoring system in accordance with the present invention, it is believed that other modifications, variations and changes will be suggested to those skilled in the art in view of the teachings set forth herein. It is, therefore, to be understood that all modifications, variations and changes are believed to fall within the scope of the present invention without departing from the spirit and scope of the invention as disclosed above.

What is claimed is:

1. A data transfer management system for use with an electromechanical machine having a housing that protects the machine from an environment, said data transfer management system comprising:

an evaluation unit located outside said housing, said evaluation unit adapted to receive, send and manipulate data signals;

a first receiving module located within said housing;

a second receiving module located within said housing, said second receiving module being electrically connected to said first receiving module so that both power and said data signals transfer between said first and second receiving modules;

at least one sensor being adapted to sense a predetermined parameter of said machine and convert said parameter to an electrical data signal, said at least one sensor being electrically connected to said first receiving module so that said data signal transfers from said sensor to said first receiving module; and means for transferring said data signal between said first receiving module and said evaluation unit, said transferring means transferring said data signal through said housing without affecting the protective integrity of said housing.

2. The data transfer management system according to claim 1, further comprising means for converting data signals received by said receiving module to a uniform bus signal.

3. The data transfer management system according to claim 1, further comprising means for compressing data signals received by said receiving module prior to transferring data signals to said evaluation unit.

4. The data transfer management system according to claim 1, further comprising means for deriving power from a power supply used to power said machine for powering said receiving module and sensors.

5. The data transfer management system according to claim 1, wherein said receiving module includes a microprocessor for controlling the processing and transmission of data received from said at least one sensor or said evaluation unit.

6. The data transfer management system according to claim 1, wherein said receiving module includes means for supplying power to said at least one sensor.

7. The data transfer management system according to claim 1, wherein said receiving module further comprises a shield for protecting said first receiving module from its environment within said housing.

8. The data transfer management system according to claim 1, wherein said housing is pressure-resistant and water-tight.

9. The data transfer management system according to claim 1, wherein said transferring means includes a data bus for transferring said data signals.

10. The data transfer management system according to claim 9, wherein said data bus supplies power to said machine.

11. The data transfer management system according to claim 7, wherein said shield includes a metal tube.

12. The data transfer management system according to claim 11, wherein said metal tube is steel.

13. The data transfer management system according to claim 11, wherein said tube is longer than said receiving module.

* * * * *